(12) United States Patent
Novak, III et al.

(10) Patent No.: US 9,340,367 B2
(45) Date of Patent: May 17, 2016

(54) FEEDER SYSTEM FOR ROD COMPONENTS OF TOBACCO PRODUCTS, AND ASSOCIATED METHOD

(71) Applicant: R. J. Reynolds Tobacco Company, Winston-Salem, NC (US)

(72) Inventors: Charles Jacob Novak, III, Winston-Salem, NC (US); Jerry Wayne Pipes, Clemmons, NC (US); Robert William Benford, Kernersville, NC (US); Timothy Frederick Thomas, High Point, NC (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 581 days.

(21) Appl. No.: 13/874,013

(22) Filed: Apr. 30, 2013

(65) Prior Publication Data

US 2013/0240326 A1    Sep. 19, 2013

Related U.S. Application Data

(62) Division of application No. 12/549,492, filed on Aug. 28, 2009, now Pat. No. 8,448,647.

(51) Int. Cl.
*A24C 1/14* (2006.01)
*B65G 47/06* (2006.01)
(Continued)

(52) U.S. Cl.
CPC ............... *B65G 47/06* (2013.01); *A24C 5/325* (2013.01); *A24C 5/343* (2013.01)

(58) Field of Classification Search
None
See application file for complete search history.

(56) References Cited

U.S. PATENT DOCUMENTS 3,405,579 A    10/1968  London
4,063,633 A    12/1977  Hall
(Continued)

FOREIGN PATENT DOCUMENTS

CN    1277592    12/2000
GB     973226    10/1964
(Continued)

OTHER PUBLICATIONS

International Search Report and Written Opinion of the International Searching Authority for corresponding International Application No. PCT/US2010/046433, mailed Feb. 7, 2011.
(Continued)

*Primary Examiner* — Michael H Wilson
*Assistant Examiner* — Phu Nguyen
(74) *Attorney, Agent, or Firm* — Womble Carlyle Sandridge & Rice LLP

(57) ABSTRACT

A feeder system and associated method are provided for feeding rod components of a tobacco product, particularly a rod-shaped, cylindrical, or stick-type tobacco product, wherein such a tobacco product may be intended to be used in a smokeless manner. A hopper is configured to receive a plurality of rod components therein. A separator device is operably engaged with the hopper and is configured to receive one of the plurality of rod components at a time therefrom. An orienting device is operably engaged with the separator device. The orienting device is configured to receive the one of the plurality of rod components in a first orientation and to direct the one of the plurality of rod components into a second orientation, different from the first orientation, and toward a subsequent process.

11 Claims, 11 Drawing Sheets

(51) Int. Cl.
*A24C 5/32* (2006.01)
*A24C 5/343* (2006.01)

(56) References Cited

U.S. PATENT DOCUMENTS

| | | | |
|---|---|---|---|
| 6,092,977 | A | 7/2000 | Fuchigami |
| D625,178 | S | 10/2010 | Bailey et al. |
| 2005/0244521 | A1 | 11/2005 | Strickland et al. |
| 2008/0029117 | A1 | 2/2008 | Mua et al. |
| 2008/0073253 | A1 | 3/2008 | Jones |
| 2009/0223989 | A1 | 9/2009 | Gelardi |
| 2010/0059074 | A1 | 3/2010 | Brantley et al. |
| 2010/0264157 | A1 | 10/2010 | Bailey et al. |
| 2011/0048435 | A1 | 3/2011 | Novak, III et al. |
| 2011/0169942 | A1 | 7/2011 | Brantley et al. |

FOREIGN PATENT DOCUMENTS

| | | |
|---|---|---|
| GB | 1110268 | 4/1968 |
| WO | WO 0005161 | 2/2000 |

OTHER PUBLICATIONS

Notice of First Office Action issued in corresponding Chinese Patent Application No. 201080048144.4 on Jan. 22, 2014.

FEEDER SYSTEM FOR ROD COMPONENTS OF TOBACCO PRODUCTS, AND ASSOCIATED METHOD

CROSS-REFERENCE TO RELATED APPLICATIONS

This application is a divisional application of U.S. patent application Ser. No. 12/549,492, filed on Aug. 28, 2009, which is hereby incorporated herein by reference in its entirety.

BACKGROUND OF THE INVENTION

1. Field of the Invention

Aspects of the present invention relate to products made or derived from tobacco, or that otherwise incorporate tobacco, and are intended for human consumption, and, more particularly, to a feeder system for rod-like components of such tobacco products, and associated method.

2. Description of Related Art

Popular smoking articles or tobacco products, such as cigarettes, have a substantially cylindrical rod-shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. Various types of smokeless tobacco products are set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,987,907 to Townsend; U.S. Pat. No. 5,092,352 to Sprinkle, III et al.; and U.S. Pat. No. 5,387,416 to White et al.; U.S. Pat. App. Pub. No. 2005/0244521 to Strickland et al.; PCT WO 04/095959 to Arnarp et al.; PCT WO 05/063060 to Atchley et al.; PCT WO 05/004480 to Engstrom; PCT WO 05/016036 to Bjorkholm; and PCT WO 05/041699 to Quinter et al., each of which is incorporated herein by reference. See also, the types of smokeless tobacco formulations, ingredients, and processing methodologies set forth in U.S. Pat. No. 6,953,040 to Atchley et al. and U.S. Pat. No. 7,032,601 to Atchley et al.; US Pat. Appl. Pub. Nos. 2002/0162562 to Williams; 2002/0162563 to Williams; 2003/0070687 to Atchley et al.; 2004/0020503 to Williams, 2005/0178398 to Breslin et al.; 2006/0191548 to Strickland et al.; 2007/0062549 to Holton, Jr. et al.; 2007/0186941 to Holton, Jr. et al.; 2007/0186942 to Strickland et al.; 2008/0029110 to Dube et al.; 2008/0029116 to Robinson et al.; 2008/0029117 to Mua et al.; 2008/0173317 to Robinson et al.; and 2008/0209586 to Neilsen et al., each of which is incorporated herein by reference. Smokeless tobacco products may, in some instances, also be provided in the form of a "stick product," such as a substantially cylindrical rod-shaped structure.

In any instance, effective packaging of such tobacco products or "stick products," whether a conventional rod-shaped smoking article, a "smokeless" rod of a tobacco product, or other tobacco product in elongate form, may be a particular concern, particularly in instances where the tobacco products are mass-produced and must be packaged individually or in small quantities. As such, there exists a need for a feeder system and associated method for rod-like components of tobacco products, capable of receiving mass-produced quantities of such tobacco products and appropriately meting the tobacco products to a package, packaging machine, or subsequent process, as necessary or desired.

BRIEF SUMMARY OF THE INVENTION

The above and other needs are met by aspects of the present invention which, in one aspect, provides a feeder system feeding rod components of a tobacco product (i.e., rod-shaped, cylindrical, or stick-type tobacco products), and, more particularly, such tobacco products intended to be used in a smokeless manner. Such a feeder system comprises a hopper configured to receive a plurality of rod components therein, and a separator device operably engaged with the hopper and configured to receive one of the plurality of rod components at a time therefrom. An orienting device is operably engaged with the separator device, wherein the orienting device is configured to receive the one of the plurality of rod components in a first orientation and to direct the one of the plurality of rod components into a second orientation, different from the first orientation, and toward a subsequent process.

Another aspect of the present invention comprises a method for feeding rod components of a tobacco product (i.e., rod-shaped, cylindrical, or stick-type tobacco products), and, more particularly, such tobacco products intended to be used in a smokeless manner. Such a method comprises receiving a plurality of rod components in a hopper, and then receiving one of the plurality of rod components at a time, from the hopper, with a separator device operably engaged therewith. The one of the plurality of rod components in a first orientation is then received from the separator device, with an orienting device, and the one of the plurality of rod components then directed into a second orientation, different from the first orientation, before the one of the plurality of rod components is directed toward a subsequent process.

Aspects of the present invention thus provide these and other advantages as detailed herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 7:
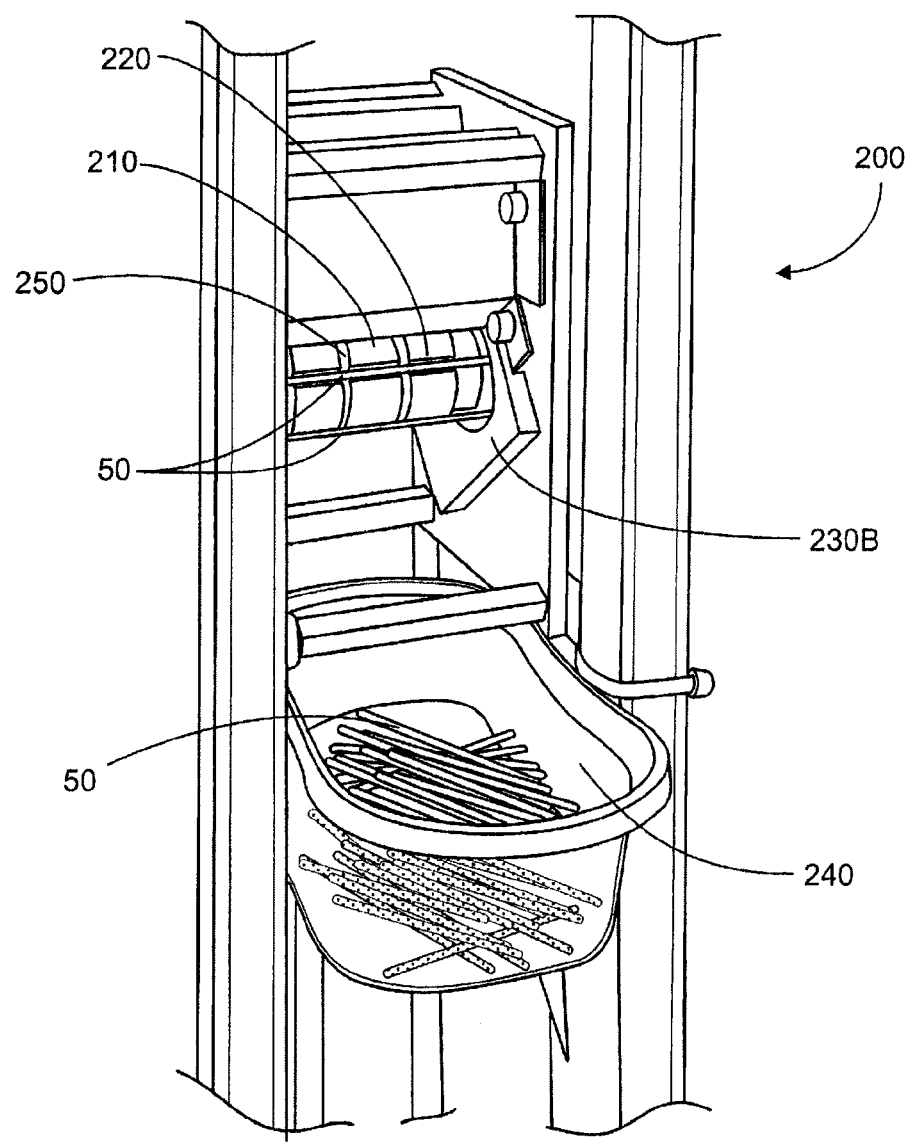
Figure 8:
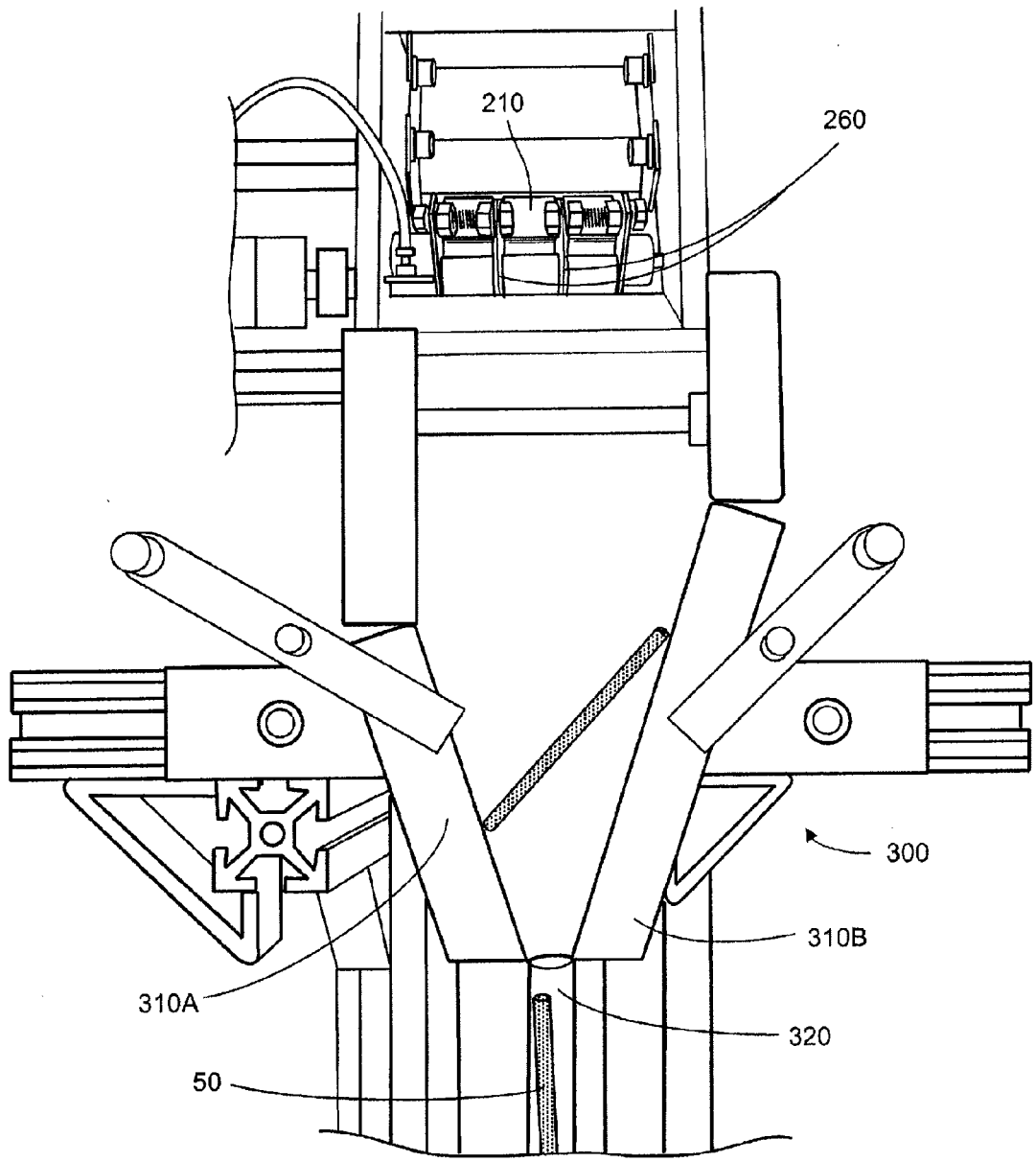
Figure 9:
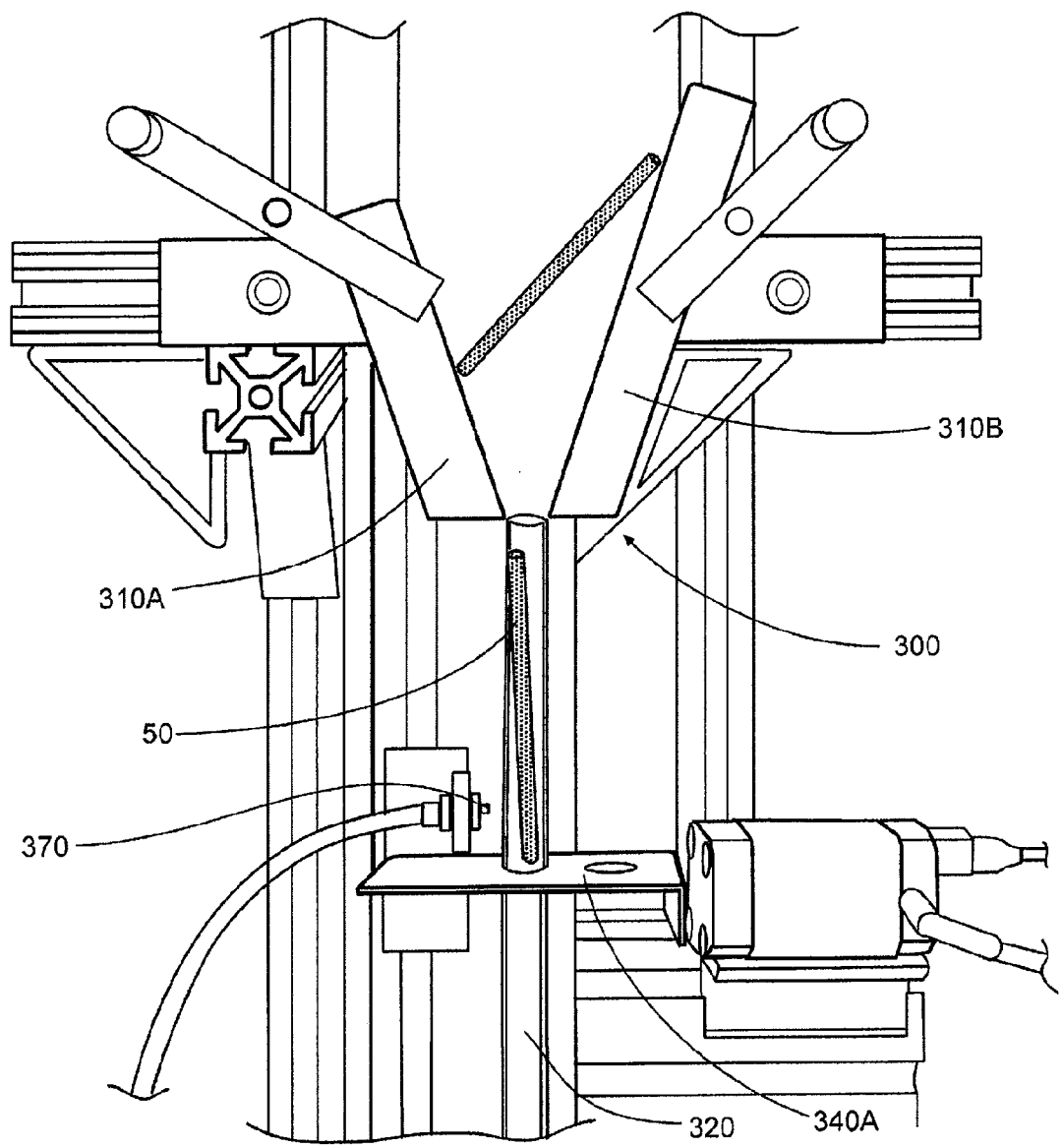
Figure 10:
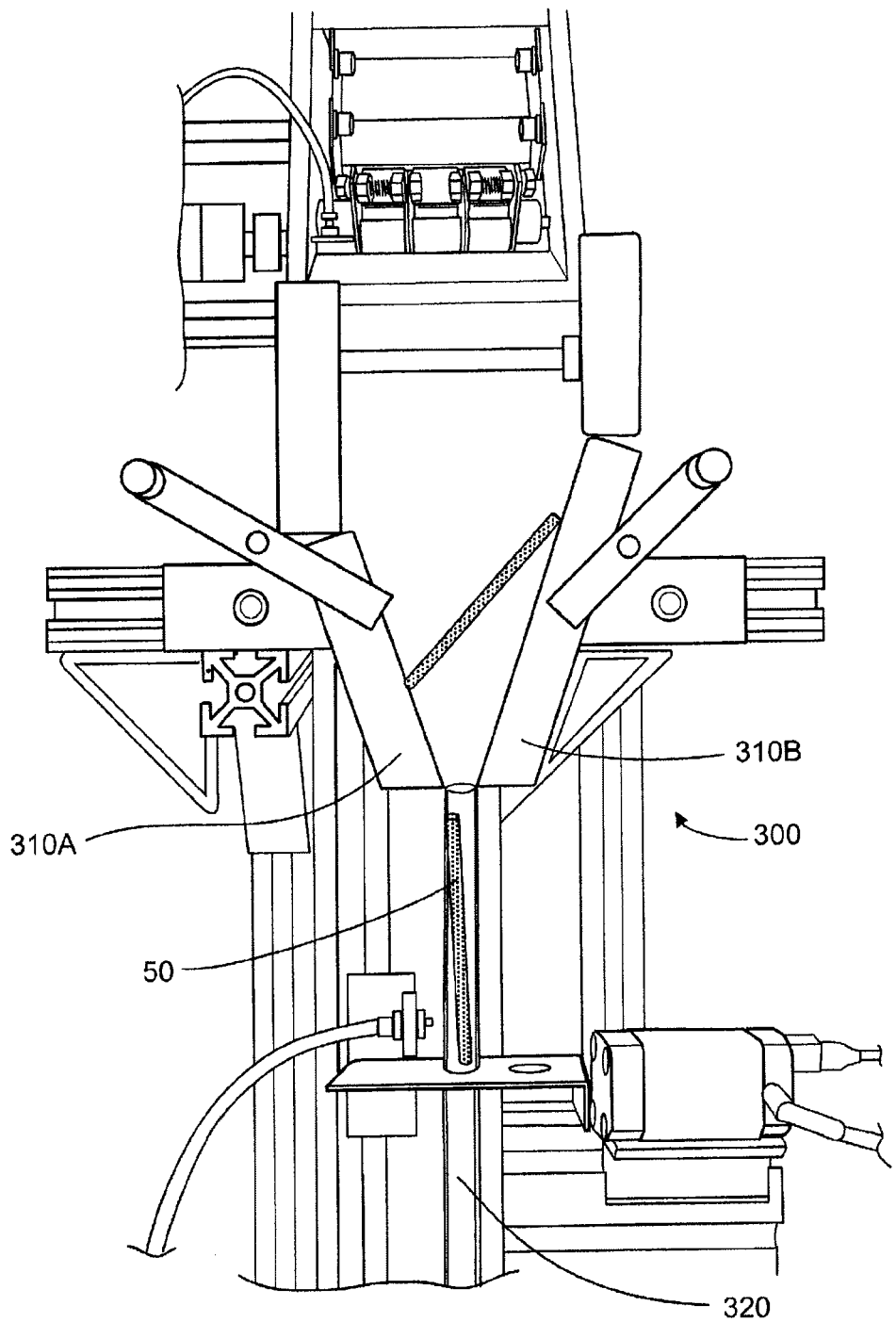

FIG. 7 a rear perspective view of a separator portion of a feeder system, according to one aspect of the present invention; and FIGS. 8-10 are front elevations of portions of an orienting device of a feeder system, according to one aspect of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
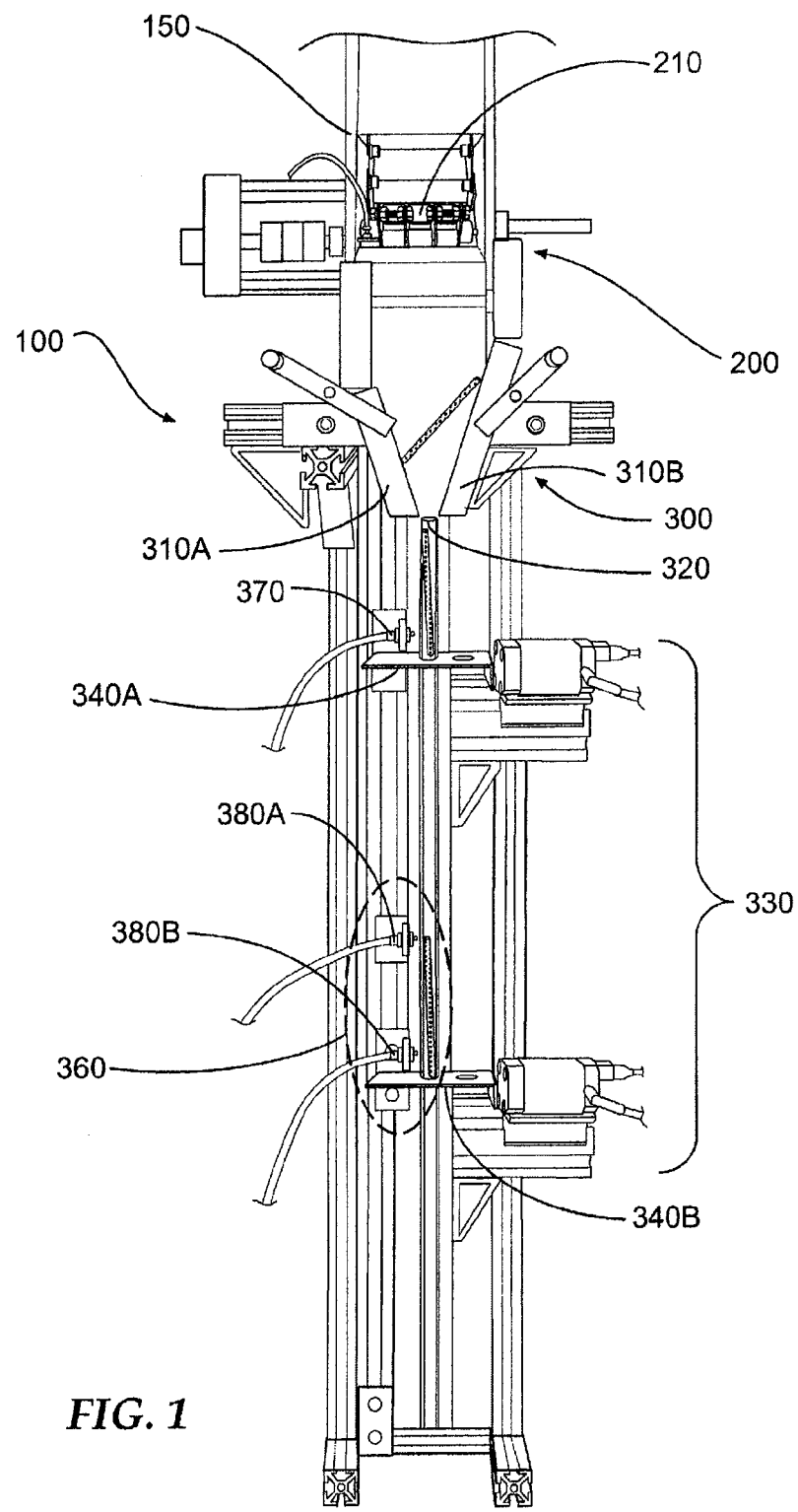
FIG. 1 is an illustration of a feeder system, according to one aspect of the present invention.

FIG. 1 illustrates a feeder system, according to one aspect of the present invention, for feeding rod components of tobacco products (i.e., rod-shaped, cylindrical, or stick-type tobacco products), and, more particularly, such tobacco products intended to be used in a smokeless manner, wherein the feeder system is indicated by the numeral 100. Such a feeder system 100 may be configured, for example, to automatically feed and collate a desired quantity of "stick products" or other rod-like tobacco products from a bulk hopper into a package, packaging machine, or any other subsequent process, whether online or offline with respect to a tobacco product manufacturing process. In some instances, the equipment according to aspects of the present invention may be particularly useful for the handling and transportation of formed or extruded tobacco rods that are intended to be employed as smokeless tobacco products. Exemplary types of technologies associated with the preparation of exemplary rods of such tobacco products are set forth in US Pat. Appl. Nos. 2005/0244521 to Strickland et al. and 2008/0029117 to Mua et al.; and others types of smokeless tobacco rod-shaped products have been commercially available as Camel Sticks by R. J. Reynolds Tobacco Company. An exemplary smokeless tobacco rod is a rod that has been formed by extruding a moist tobacco formulation, and has dimensions of about 75 mm in length and about 2.9 mm in diameter. An exemplary type of smokeless tobacco rod is a rod formed from a tobacco formulation, and that rod possesses a substantially self-sustaining integrity, without the necessity of an outer wrapping material (e.g., a cigarette paper wrapper type of material). Exemplary smokeless tobacco rods can be packaged in the types of packages set forth, for example, in U.S. patent application Ser. Nos. 12/042,215 to Gelardi, filed Mar. 4, 2008; 12/425,180 to Bailey et al., filed Apr. 16, 2009; and 29/342, 212 to Bailey et al., filed Aug. 20, 2009. Each feeder system 100 may be configured to feed one rod component at a time and, as such, aspects of the feeder system 100 may be considered "modular" in that two or more of the feeder systems 100 may be concurrently implemented to deliver a desired quantity of the rod-like tobacco products to the package, packaging machine, or subsequent process, as necessary or desired.

Figure 2A:
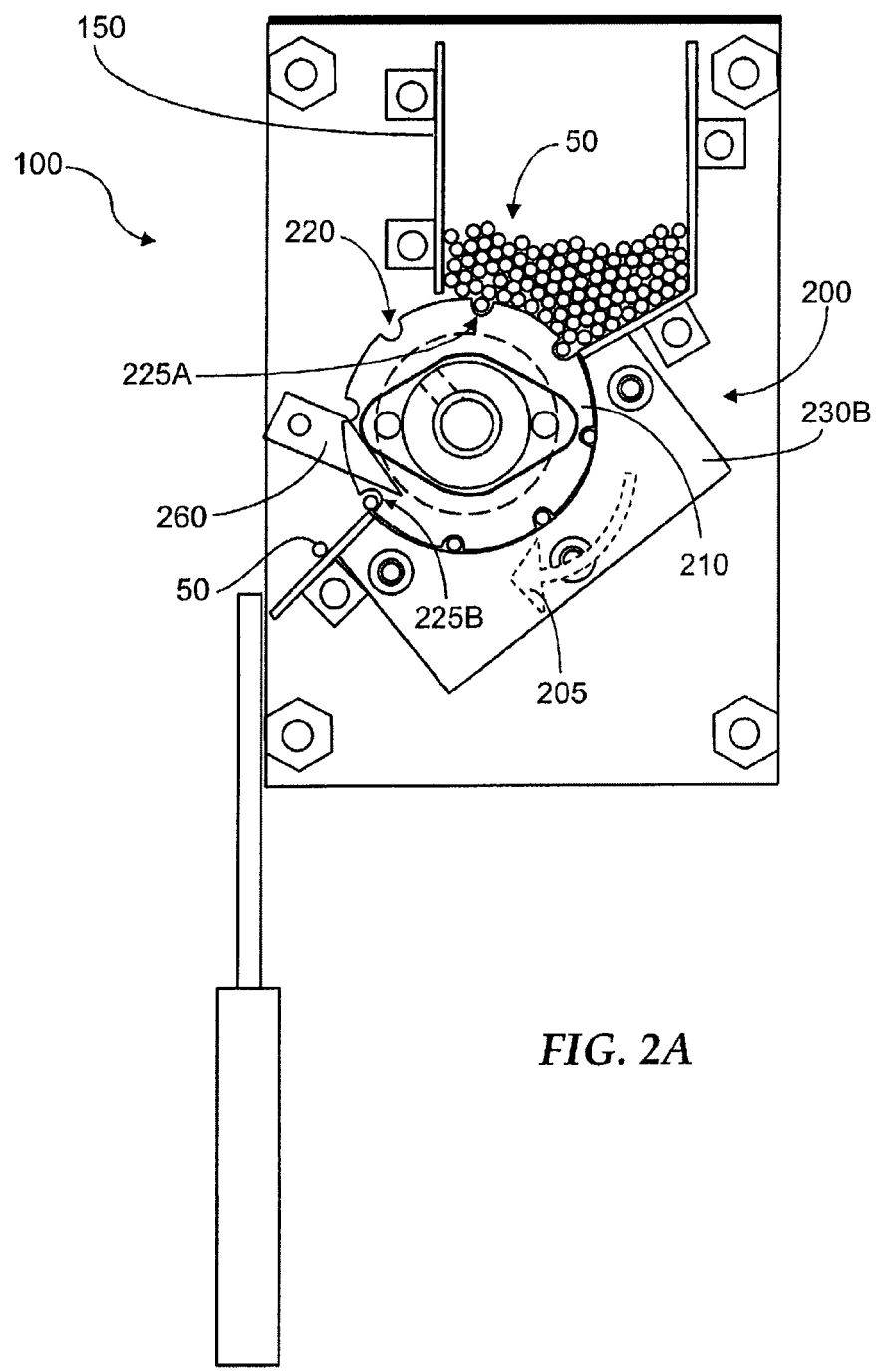
FIG. 2A is a schematic cross-sectional view of a separator portion of a feeder system, according to one aspect of the present invention.
Figure 2B:
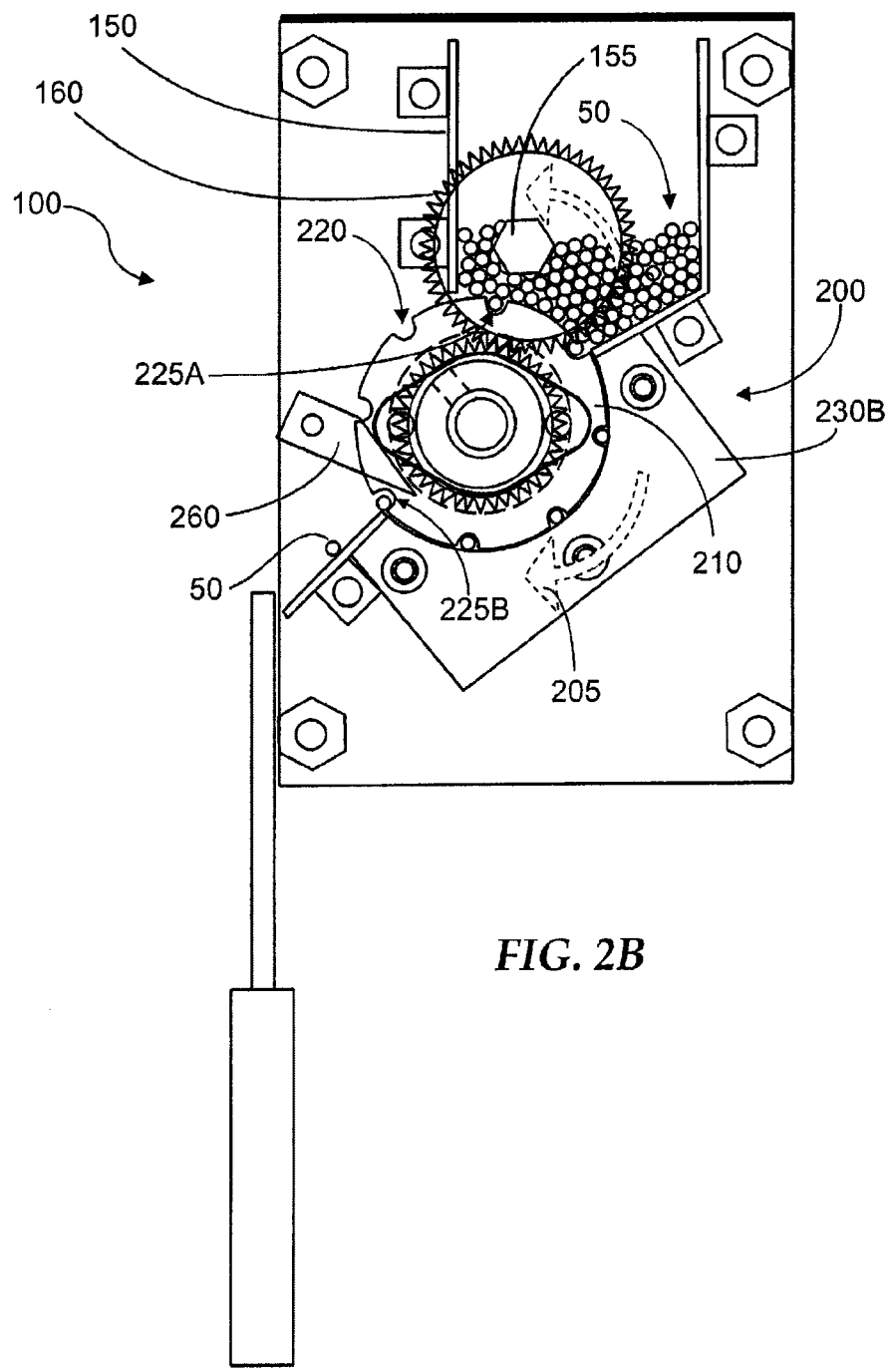
FIG. 2B is a schematic cross-sectional view of a separator portion of a feeder system, according to another aspect of the present invention.
Figure 3:
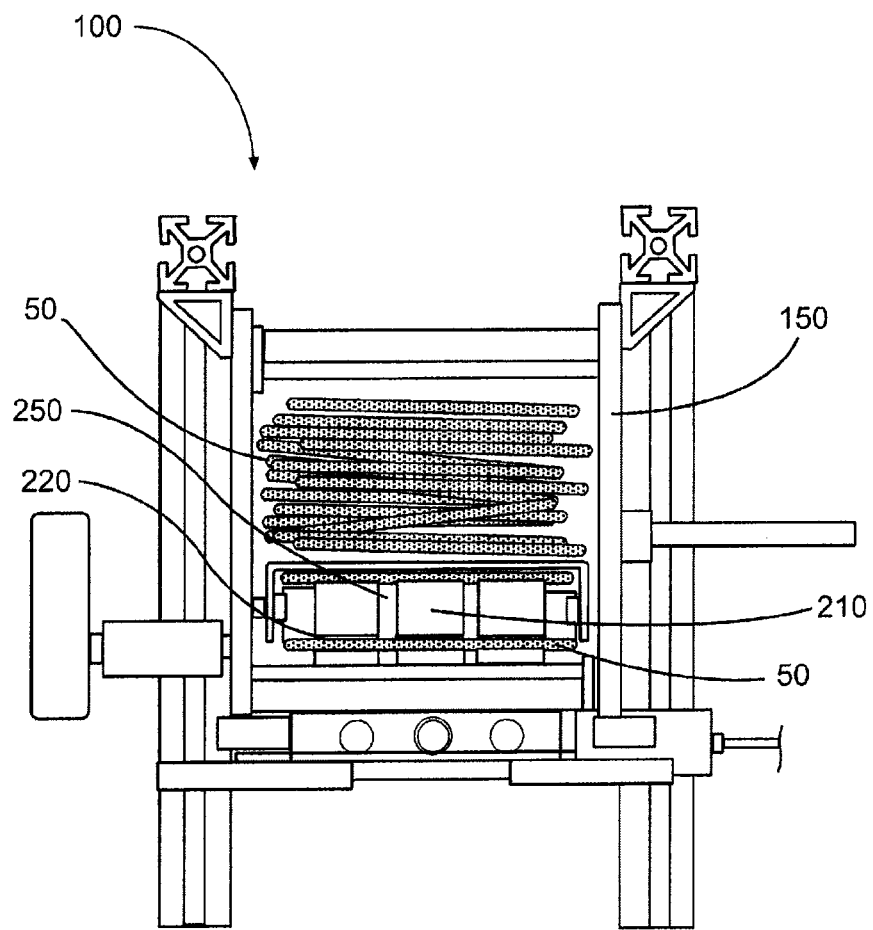
FIG. 3 is a perspective plan view of a separator portion of a feeder system, according to one aspect of the present invention.

As shown in FIGS. 1-3, aspects of the feeder system 100 may comprise a hopper 150 for receiving one or more of the rod-like tobacco products. In some instances, the tobacco products may comprise rod components 50 of a smoking article, such as a cigarette, the entire smoking article itself, or an entire rod-shaped smokeless tobacco product or portion thereof. In this regard, such rod components 50 may be, for example, as-formed cigarettes, filter rod components thereof, tobacco rods associated therewith, or a smokeless rod-shaped tobacco products or portions thereof. As such, each rod component 50 generally comprises an elongate member defining a longitudinal axis. One configuration of the hopper 150 is thus arranged to accommodate one or more of the rod components 50 therein with the longitudinal axes thereof aligned substantially parallel to each other. That is, the rod components 50 are contained by the hopper 150 such that the longitudinal axes of the rod components 50 are laterally displaced with respect to each other. Further, though the hopper 150 containing the rod components 50 may be disposed in many different orientations, one particular aspect of the present invention involves the hopper 150 being oriented such that the axes of the rod components 50 are substantially horizontal.

In some instances, the rod components 50 may be deposited in the hopper 150 in an as-formed state, wherein such rod components 50 may not necessarily have been subjected an inspection or quality control process. As such, in particular instances, it may be beneficial to subject each of the rod components 50 to a verification process as the rod components 50 are processed by the feeder system 100. As such, as shown in FIGS. 1-7, some aspects implement a separator device 200 operably engaged with the hopper 150 and configured to receive one of the rod components 50 at a time therefrom. The separator device 200 may comprise a separator member 210, wherein the separator member 210 may be a substantially cylindrical member rotatable in a rotational direction 205 (FIGS. 2A and 2B) about a longitudinal axis defined thereby. Further, the separator member 210 may be configured to define at least one groove 220 extending parallel to the longitudinal axis of the separator member 210. In one aspect, the separator member 210 may be disposed adjacent to the hopper 150 (i.e., such that the longitudinal axis of the separator member 210 is substantially parallel to the longitudinal axes of the rod components 50) such that one of the plurality of rod components 50 may be received from the hopper 150 into the at least one groove 220 defined by the separator member 210, for example, under the influence of gravity, upon registration of each groove with the hopper 150.

In order to provide a continued feeding of the rod components 50 from the hopper 150, the separator member 210 may define a plurality of grooves 220, with each groove 220 extending parallel to the longitudinal axis of the separator member 210. In addition, the grooves 220 may be spaced apart (i.e., angularly) about the separator member 210. Further, the rotatable configuration (about the longitudinal axis) of the separator member 210 causes each of the grooves 220 to sequentially register with the hopper 150 as the separator member 210 is rotated about the longitudinal axis thereof. The separator device 200 may also comprise an appropriate actuator (not shown) for effecting the rotation of the separator member 210, as necessary or desired. For example, the actuator may comprise an electric motor, a stepper actuator, or any other suitable mechanism. In being configured to be rotatable, the separator member 210 may be further configured to receive a rod component 50 from the hopper 150 and into one of the grooves 220 at a first angular position 225A of the separator member 210 (i.e., about the 12 o'clock position) and to dispense the rod component 50 at a second angular position 225B of the separator member 210 (i.e., about the six o'clock or seven o'clock position), wherein the second angular position 225B may be spaced apart from the first angular position 225A in the rotational direction 205 of the separator member 210, as shown in FIGS. 2A and 2B.

In one particular aspect, the separator member 210 may be rotated by an electric motor with appropriate speed reduction gearing to produce a rotational speed of the separator member 210 of between about 10 rpm and about 30 rpm. In addition, the separator member 210 may have a cylindrical portion defining a major diameter, for example, of between about 2 inches and about 3 inches, with that cylindrical portion having a length along the longitudinal axis, for instance, of about 20 mm to about 30 mm less than the nominal/desired length of the rod component(s) 50. Further, the separator member 210 may be configured so as to define, for example, 8 grooves 220 evenly spaced apart about the periphery/circumference of the separator member 210, with each groove 220 extending along the longitudinal axis of the separator member 210. In such instances, each groove 220 may have a width of about 1 mm greater than the diameter of the rod component 50 to be received thereby, and a depth at least equal to the diameter of the rod component 50 (i.e., about 3 mm).

In another aspect, as shown, for example, in FIG. 2A, the hopper 150 may also include an agitator member 155 disposed therein. Such an agitator member 155 may be provided, for instance, to prevent the rod components 50 from binding or otherwise becoming lodged in the hopper 150 due to, for example, the weight of the rod components 50 disposed within the hopper 150. In one instance, the agitator member 155 may be configured to extend across the hopper 150, for instance, in an orientation substantially parallel to the rod components 50 within the hopper 150. The agitator member 155 may be further configured to be polygonal (i.e., hexagonal) in cross section, and to be rotatable about an axis disposed substantially parallel to the rod components 50 within the hopper 150. In some instances, the agitator member 155 may be rotationally driven, for example, by a gear member 160 driven by an electric motor, or through engagement with the gearing associated with the separator member 210, in a rotational direction opposite to the rotational direction 205 of the separator member 210. The agitator member 155 may be cantilevered or rotationally supported about each end. In one instance where the gear member 160 is driven by the separator member gearing, the drive/driven ratio of the respective gears is about 0.77:1.

Figure 4:
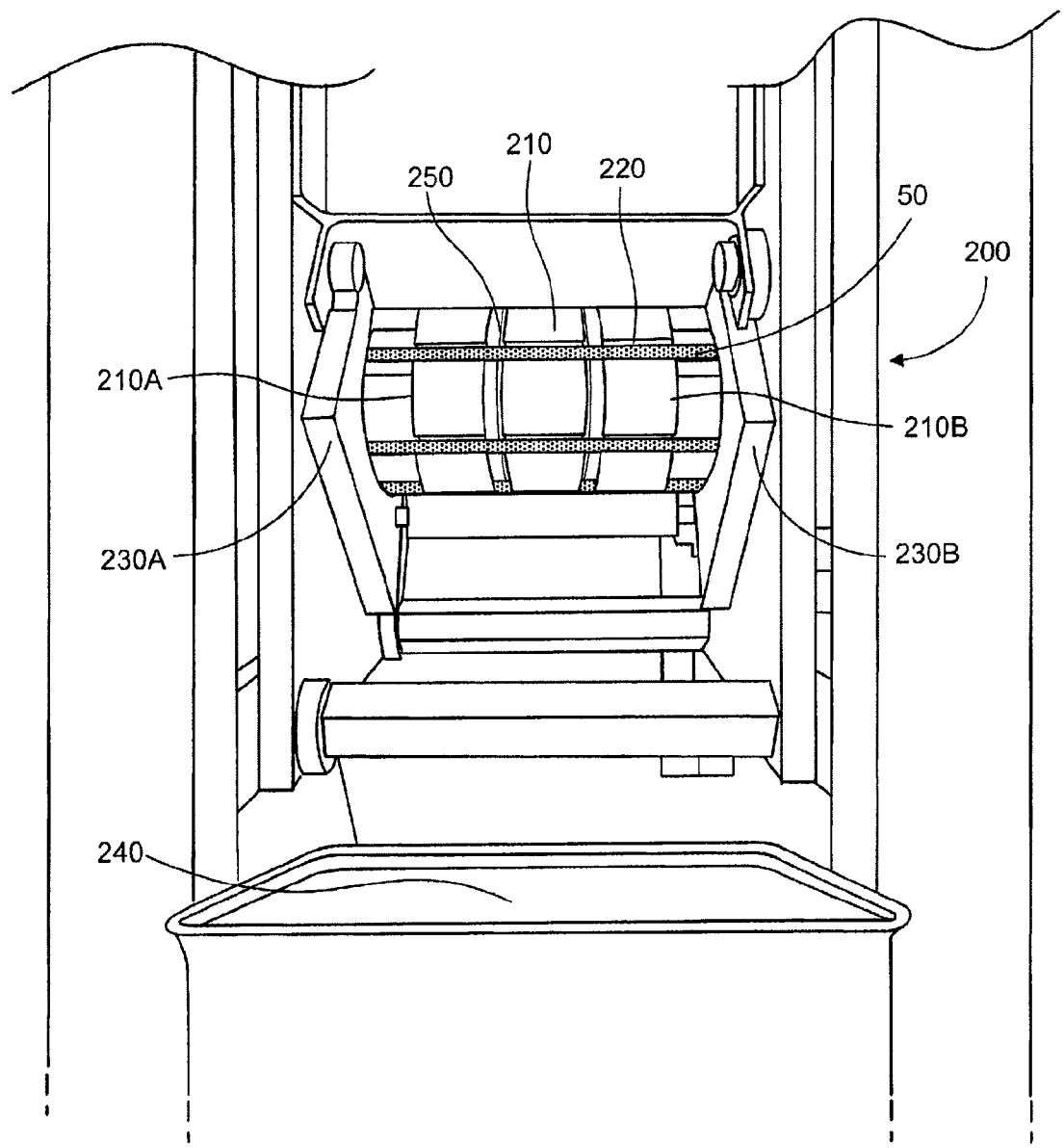
FIG. 4 is a rear elevation of a separator portion of a feeder system, according to one aspect of the present invention.
Figure 5:
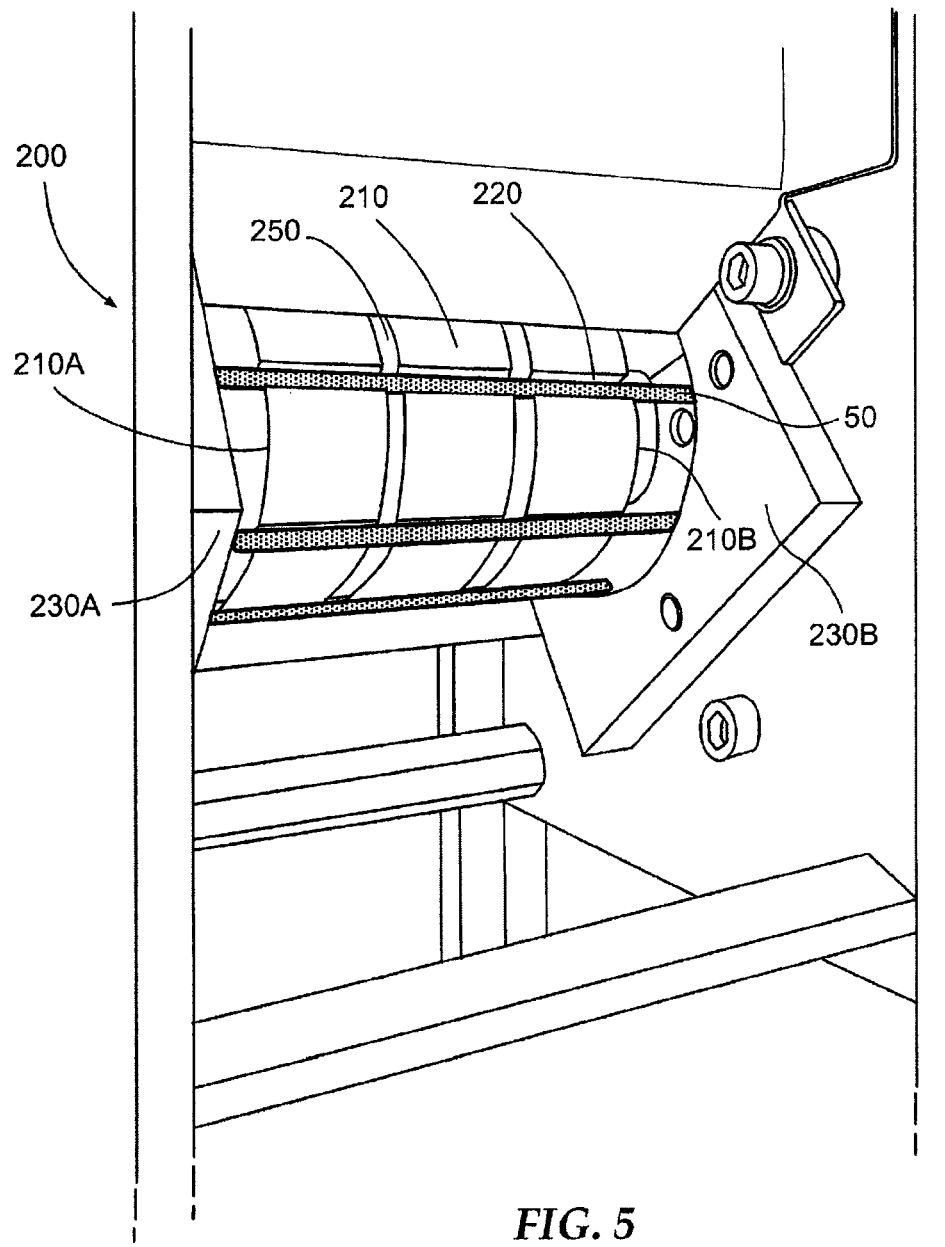
FIG. 5 is a rear perspective view of a separator portion of a feeder system, according to one aspect of the present invention.
Figure 6:
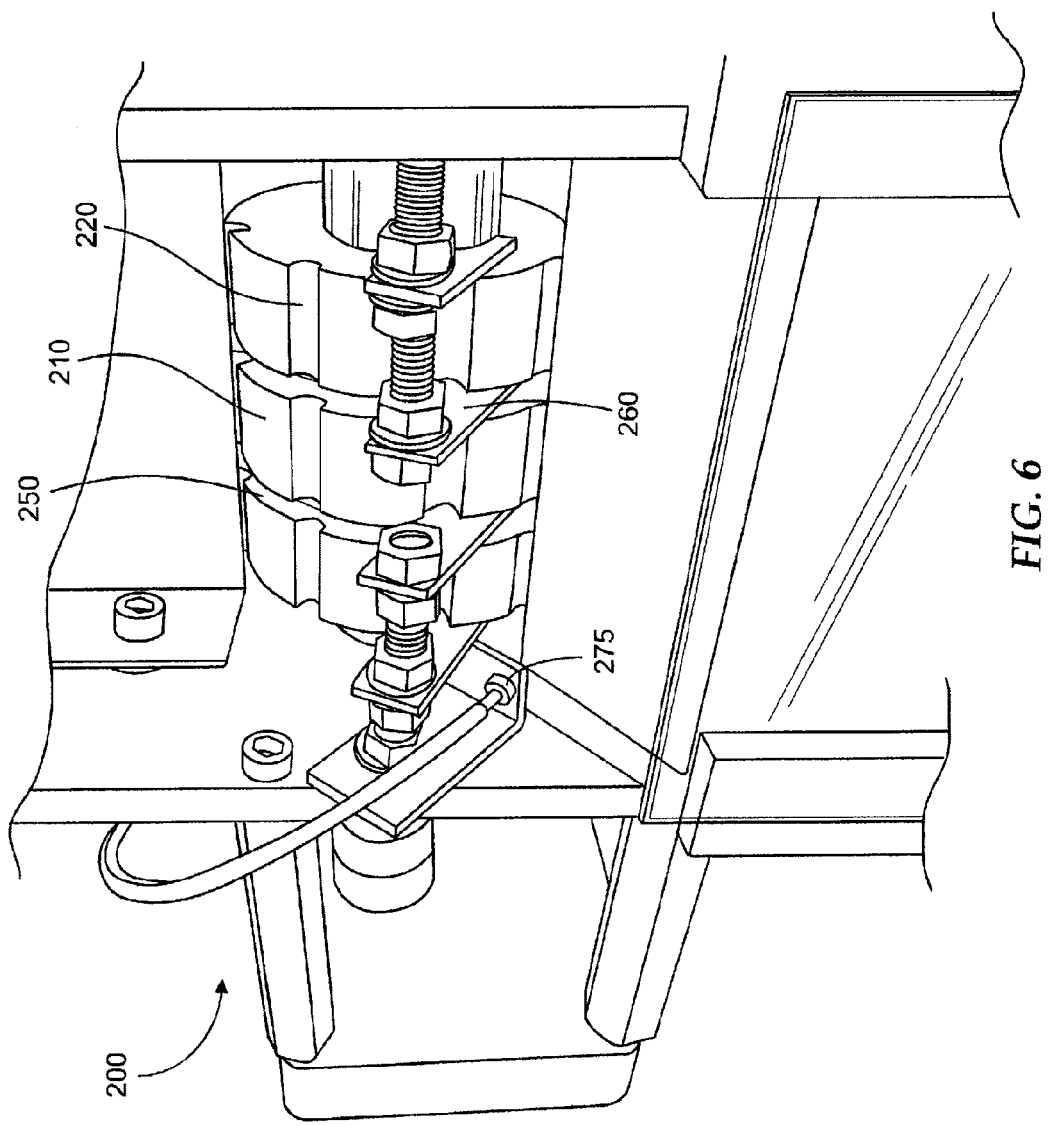
FIG. 6 is a front perspective view of a separator portion of a feeder system, according to one aspect of the present invention.

As shown in FIGS. 4 and 5, the separator member 210 has opposed first and second ends 210A, 210B spaced apart along the longitudinal axis thereof. In some instances, the separator device 200 further comprises opposing first and second sizing members 230A, 230B disposed about the respective first and second ends 210A, 210B of the separator member 210. Each of the first and second sizing members 230A, 230B may be further configured to extend in the rotational direction 205 of the separator member 210 and at least partially between the first and second angular positions 225A, 225B of the separator member 210. In being so configured, the first and second sizing members 230A, 230B are spaced apart along the longitudinal axis of the separator member 210 by a designated distance corresponding to a desired length of the rod component(s) 50 received by the separator member 210. As such, as the individual rod component(s) 50 are transported by the separator member 210 from the first angular position 225A to the second angular position 225B, any rod component 50 of at least the desired length will be retained with respect to the separator member 210 and then dispensed from the separator member 210 at the second angular position 225B. Conversely, any rod component(s) 50 not meeting the desired (minimum) length may not be retained with respect to the separator member 210, and instead may be released therefrom, past the first and second sizing members 230A, 230B. According to some aspects, the spacing between the first and second sizing members 230A, 230B can be varied to allow, for example, different levels of sensitivity in accepting/rejecting rod components 50 not meeting the desired/minimum length criteria. In some aspects, those rod components 50 not meeting the desired length may be directed to or otherwise collected by a reject receptacle 240 (FIGS. 4 and 7). In some instances, the reject receptacle 240 may be disposed adjacent to the separator device 200/separator member 210 between the first and second angular positions 225A, 225. In other instances, the rod component(s) 50 of less than the desired length may be directed, for example, by an appropriate chute member (not shown), to the reject receptacle 240 which may be remotely disposed or otherwise spaced apart from the separator device 200/separator member 210.

In some aspects, as shown in FIGS. 4-7, the separator member 210 may further define one or more channels 250 extending circumferentially thereabout so as to intersect the grooves 220 (i.e., oriented perpendicularly to the grooves 220). The channel(s) 250 may be, for example, between about 1 mm and about 5 mm wide, and between about 3 mm and about 10 mm deep (i.e., at least as deep as the groove(s) 220). In one instance, two such channels 250 are provided, wherein the channels 250 are spaced apart along the cylindrical portion of the separator member 210 so as to divide the length thereof into three substantially equal length portions. In such instances, the separator device 200 may further include a removal member 260 corresponding to each channel 250. The removal member(s) 260 may be disposed about the second angular position 225B of the separator member 210, and may be configured to extend into the respective channel 250 as the separator member 210 is rotated in the rotational direction 205. The removal member(s) 260 may be further configured to extend into the respective channel 250 at least as far as the depth of the respective groove 220 so as to facilitate dispensation/release of the rod components 50 from the grooves 220 of the separator member 210, as the respective groove 220 is disposed about the second angular position 225B.

In order to direct the rod component(s) 50 from the separator device 200 to the package, packaging process, or subsequent process, it may be desirable for the rod component(s) 50 to be disposed in a particular orientation upon delivery. As such, the feeder system 100 may further comprise an orienting device 300 operably engaged with the separator device 200 (FIGS. 1, 3, and 8-10). The orienting device 300 may be further configured to receive a rod component 50 from the separator device 200 in a first orientation and to direct the rod component 50 into a second orientation, different from the first orientation, and toward the package, packaging process, or subsequent process.

In so determining the orientation of the rod component(s) 50 released from the separator member 210, the orienting device 300 may be configured to receive and re-orient one such rod component 50 at a time. As such, according to one aspect, a dispensation sensor 275 (FIG. 6) may be operably engaged between the separator device 200 and the orienting device 300, wherein the dispensation sensor 275 may be configured to pause/stop (i.e., in a stepper-like process) the rotation of the separator member 210 until one rod component 50 is received and re-oriented by the orienting device 300 from the first orientation to the second orientation, in response to dispensation sensor 275 sensing one rod component 50 being dispensed/released from the separator member 210. In one example, the dispensation sensor 275 may comprise a fiber-optic photosensor configured to detect the one rod component 50 as it traverses the sensing field (i.e., travel path visible to the photosensor). The photosensor may be in communication with the actuator driving the rotation of the separator member 210 in the rotational direction, for example, by a control device/system (i.e., a programmable logic controller configured to run appropriate software) operably engaged therebetween, wherein actuator is de-actuated to stop the rotation of the separator member 210 after one rod component 50 has been dispensed/released from the separator member 210 and is detected by the dispensation sensor 275. Accordingly, this scheme may provide, for instance, an indexing or stepped rotation of the separator member 210. In other instances, for example, a timed delay may also be implemented by the control device/system to pause/stop the rotation of the separator member 210 a short time (i.e., milliseconds) after the photosensor detects the dispensation/release of one rod component 50, so as to allow sufficient time for the detection field of the photosensor to be cleared, or to otherwise ensure appropriately timed operation of the feeder system 100.

In some instances, the rod component 50 dispensed/released from the separator member 210 is oriented in a horizontal orientation (i.e., the first orientation). However, with respect to a subsequent process such as, for example, a package in a packaging process, a packaging machine in a packaging process, or other subsequent process involving interaction with the rod component 50, as necessary or desired, it may be advantageous for the rod component 50 to be directed toward that subsequent process along a longitudinal axis defined by that rod component 50. As such, since some aspects of the feeder system 100 may involve the rod component(s) 50 being fed under the influence of gravity, it may be advantageous and desirable for the rod component 50, released from the separator member 210 in the horizontal position (i.e., the first orientation) to be re-oriented to a substantially vertical position (i.e., a second orientation), such that gravity causes the rod component 50 to proceed along the feed system 100 in a second orientation along the longitudinal axis of that rod component 50. Accordingly, in some aspects, the orienting device 300 may be further configured to interact with a first one of the opposed ends of the rod component 50, upon the rod component 50 being released from the separator member 210 in a first (i.e., horizontal) orientation, such that gravity causes the second one of the opposed ends of the rod component 50 to proceed downwardly ahead of the first end. In those instances, the rod component 50 thus essentially rotates about the first end thereof to proceed from the first (i.e., horizontal) orientation to the second (i.e., vertical) orientation.

In one example, as shown in FIGS. 1 and 8-10, the orienting device 300 may include opposed inclined members 310A, 310B, wherein one of the inclined members (i.e., 310A) may be disposed about the separator member 210 to interact with the first end of the released rod component 50 prior to the other of the inclined members (i.e., 310B) interacting with the second end of the rod component 50. In one aspect, the inclined members 310A, 310B may be arranged so as to converge in a direction away from the separator member 210. In doing so, however, one of the inclined members (i.e., 310A) may be disposed at a greater angle with respect to the separator member 210, than the other inclined member (i.e., 310B). In other instances, both inclined members 310A, 310B may be disposed at substantially the same angle with respect to the separator member 210, but one inclined member (i.e., 310A) may be disposed closer in proximity to the separator member 210 than the other inclined member (i.e., 310B). In any instance, the inclined members 310A, 310B define, or are otherwise an initial portion of or are operably engaged with an initial portion of, a feed channel 320 configured to direct the rod component 50 in the second orientation toward the subsequent process. Following the initial portion of the feed channel 320, which may be configured, for example, similarly to a funnel, the subsequent portion of the feed channel 320 may be configured to maintain the rod component 50 in the second orientation, or at least in an orientation in which the rod component 50 can be directed along the longitudinal axis thereof. As such, the subsequent portion of the feed channel 320 may be vertically oriented of appropriately inclined, as necessary or desired. Further, the subsequent portion of the feed channel 320 is configured with an appropriate cross-sectional size and shape, as well as length, to receive and direct the rod component 50, without undue restriction, therealong (i.e., under the force of gravity).

Once the rod component 50 is received within the feed channel 320 in the second orientation, it may, in some instances, be desirable or advantageous to have the capability of meting the rod component(s) 50 through the feed channel 320 in order to control or regulate the feeding of the rod components 50 to the subsequent process. As such, in some aspects, the feed channel 320 may have an isolation device 330 operably engaged therewith, as shown in FIGS. 1, 3, 9, and 10. In one example, the isolation device 330 may comprise first and second gate members 340A, 340B, wherein each of those gate members 340A, 340B is configured to retractably extend at least partially across the feed channel 320 via, for instance, appropriate apertures (not shown) defined by the structure of the feed channel 320. In addition, the first and second gate members 340A, 340B may be spaced apart along the feed channel 320 by at least a desired/minimum length of the rod component 50 being handled by the feeder system 100. In being so configured, the first gate member 340A may be disposed in closer proximity to the separator member 210, and may further be configured to be retracted from the feed channel 320 upon detection of a rod component 50 being released from the separator member 210, entering the initial portion of the feed channel 320, and/or being stopped/impeded by the first gate member 340A. Such detection may be accomplished, for instance, by the dispensation sensor 275 or a separate presence sensor 370 operably engaged with the feed channel 320 and disposed prior to the first gate member 340A (i.e., between the separator member 210 and the first gate member 340A). In the alternative, the first gate member 340A may be configured to be retracted from the feed channel 320 upon a rod component 50 being released further along the feed channel 320 by the second gate member 340B, and the second gate member 340B being extended back into the feed channel 320 as disclosed further herein.

In one example, a rod component 50 may be directed by gravity along the feed channel 320 until progress thereof is impeded by the first gate member 340A in the non-retracted position. Once the presence of the rod component 50 at the first gate member 340A is determined by the presence sensor 370 (i.e., a photosensor) and communicated to the control device/system, the control device/system determines an appropriate time to retract the first gate member 340A, for example, using a pneumatic actuator. The control device/system may be further configured to retain the first gate member 340A in the retracted position for a pre-determined duration of time (i.e., less than 1 second) so as to allow the rod component 50 to proceed by gravity through the first gate member 340B so to be stopped/impeded by the second gate member 340B. Upon expiration of the pre-determined time, the control device/system may be further configured to direct the pneumatic actuator to move the first gate member 340A back in to the non-retracted position.

More particularly, one function of the isolation device 330 may be, for example, to isolate one rod component 50 from other rod components 50 subsequently directed along the feed channel 320 toward the subsequent process. In doing so, the second gate member 340B is configured to impede the progress of a rod component 50 when in the non-retracted position (i.e., extending at least partially across the feed channel 320). As such, a retracted first gate member 340A and a non-retracted second gate member 340B allows one rod component 50 to proceed along the feed channel 320 until progress therethrough is impeded by the second gate member 340B. Once that rod component 50 is detected, as discussed further herein, as being retained by the second gate member 340B, the first gate member 340A may be further configured to extend back into the feed channel 320 such that the particular rod component 50 is disposed and isolated between the first and second gate members 340A, 340B, while any subsequent rod components 50 directed along the feed channel 320 are impeded and retained by the first gate member 340A.

In accomplishing the isolation procedure for the rod component 50, the isolation device 330 may further comprise an inspection device 360 (FIG. 1) operably engaged with the feed channel 320 between the first and second gate members 340A, 340B. In on aspect, the inspection device 360 may comprise first and second sensor devices 380A, 380B, such as photosensors, operably engaged with the feed channel 320 so as to be capable of interacting with the rod component 50 disposed between the first and second gate members 340A, 340B. Further, the first and second sensor devices 380A, 380B may be spaced apart along the feed channel 320 by no more than the desired/minimum length of the rod component 50. In being so configured, the inspection device 360 may serve to detect the presence of the rod component 50 between the first and second gate members 340A, 340B, as well as to determine whether the rod component 50 meets the particular desired/minimum length.

Once the rod component 50 is isolated, the controller device/system may be further configured to retract the second gate member 340B from the feed channel 320 using, for example, a pneumatic actuator, at the appropriate time and/or upon determination by the first and second sensor devices 380A, 380B of the isolated rod component 50 having at least the desired/minimum length, so as to release the rod component 50 from the isolation device 300. The control device/system may be further configured to retain the second gate member 340B in the retracted position for a pre-determined duration of time (i.e., less than 1 second) so as to allow the rod component 50 to proceed by gravity through the second gate member 340B toward the subsequent process. Upon expiration of the pre-determined time, the control device/system may be further configured to direct the pneumatic actuator to move the second gate member 340B back in to the non-retracted position. In such instances, if the rod component 50 meets the desired/minimum length criteria, that rod component 50 may be directed from the isolation device 300 to the subsequent process. Otherwise, any rod component 50 not meeting the desired/minimum length may be directed to a reject/re-work process, or to a different feeding system/process having a lower desired/minimum length requirement for the rod component 50.

In instances where the rod component 50 has a greater length than the desired/minimum length, or is otherwise greater/longer than the upper limit of a desired length range, the feeder system 100 may further comprise a cutting assembly (not shown) configured to receive any over-length rod component 50 and to cut that rod component 50 to the desired/minimum length or otherwise to a length within the desired range of lengths. The rod component 50 released by the second gate member 340B is then further directed along the feed channel 320 to the subsequent process, wherein such a subsequent process may include, for example, packaging the rod component(s) 50 in an end-use consumer box, plastic package or bottle, and/or a pouch formed of a flexible material. In other instances, the subsequent process may include, for instance, feeding the rod component(s) 50 to a subsequent feed tube forming a portion of a secondary packaging machine or process.

As such, as previously discussed, a feeder system according to aspects of the present invention may thus be configured, for example, to automatically feed and collate a desired quantity of "stick" or rod-like tobacco products from a bulk hopper into a package, packaging machine, or any other subsequent process, whether online or offline with respect to a tobacco product manufacturing process. Further, each feeder system 100 may be configured to feed one rod component at a time and, as such, aspects of the feeder system 100 may be considered "modular" in that two or more of the feeder systems 100 may be concurrently implemented to deliver a desired quantity of the rod-like tobacco products to the package, packaging machine, or subsequent process, as necessary or desired. In one aspect, the feeder system 100 may be configured such that the control device/system receives an appropriate signal, such as a timing signal or on-demand signal, from the subsequent process, such as a downstream or secondary packaging machine process, that triggers/actuates the feeder system 100 and associated process/sequence of feeding events, as described above. Thus, one skilled in the art will appreciate that the above feeder system 100 may have an associated method for feeding rod components of a tobacco product.

Many modifications and other embodiments of the inventions set forth herein will come to mind to one skilled in the art to which these inventions pertain having the benefit of the teachings presented in the foregoing descriptions and the associated drawings. For example, compressed air or other pressurized gas may be implemented, as will be appreciated by one skilled in the art, to assist the feed of the rod component(s) 50 through the feed channel(s) 320. In another example, a conveyor or other transportation device may be operably engaged with and used to refill the hopper 150 with rod components 50. Still further, the number of grooves 220 formed in the separator member 210 may vary (i.e., from one to 16 slots or more). In addition, a stepper device or servo-controlled motor and drive system may be implemented to rotate the separator member 210, in the alternative to a DC gear motor with photosensor stop signal, and the separator member 210 may be rotated at various rotational speeds. Yet still, only one, or more than two, gate members may be implemented to effectuate feeding of the rod components 50. Also, a vision camera or other imaging system may be used for quality verification of the rod components 50 in the alternative or in addition to the two photocells of the inspection device 360, and may be disposed adjacent to any of the gate members. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for feeding rod components of a tobacco product, said method comprising:
   receiving a plurality of rod components in a hopper;
   receiving one of the plurality of rod components at a time, from the hopper, with a separator device operably engaged therewith, the separator device being substantially cylindrical and rotatable about a longitudinal axis defined thereby, and comprising a separator member defining at least one groove extending parallel to the longitudinal axis thereof, the separator member further defining at least one channel extending circumferentially thereabout so as to intersect the at least one groove, wherein the separator device further comprises a removal member, and wherein receiving the one of the plurality of rod components at a time further comprises:
      receiving one of the rod components from the hopper in the at least one groove defined by the separator member, upon registration thereof with the hopper, at a first angular position of the separator member;
      dispensing the one rod component to an orienting device at a second angular position of the separator member, the second angular position being spaced apart from the first angular position in a rotational direction of the separator member; and
      extending the removal member, disposed about the second angular position of the separator member, into the at least one channel upon rotation of the separator member to the second angular position so as to facilitate dispensation of the one rod component from the at least one groove to the orienting device; and
   receiving the one of the plurality of rod components in a first orientation, from the separator device, with the orienting device, and directing the one of the plurality of rod components into a second orientation, different from the first orientation, with the orienting device, before directing the one of the plurality of rod components toward a subsequent process.

2. A method according to claim 1 wherein each rod component defines a longitudinal axis and receiving the plurality of rod components further comprises receiving the plurality of rod components in the hopper such that the longitudinal axes thereof are disposed substantially in parallel.

3. A method according to claim 1 wherein the separator member defines a plurality of grooves, each groove extending parallel to the longitudinal axis of the separator member, with the grooves being spaced apart about the separator member, and the method further comprises sequentially registering the grooves with the hopper as the separator member is rotated about the longitudinal axis thereof.

4. A method according to claim 1 further comprising gravitationally feeding the one of the plurality of rod components from the hopper into the at least one groove defined by the separator member.

5. A method according to claim 1 wherein the separator member has opposed first and second ends spaced apart along the longitudinal axis thereof, and the separator device further comprises first and second sizing members disposed about the respective first and second ends between the first and second angular positions, with the first and second sizing members being spaced apart by a designated distance corresponding to a desired length of the one rod component, and the method further comprises rotating the separator member between the first and second angular positions such that any rod component of at least the desired length is retained with respect to the separator member and dispensed therefrom at the second angular position.

6. A method according to claim 5 further comprising receiving any rod component of less than the desired length, not retained with respect to the separator member by the first and second sizing members, in a reject receptacle disposed adjacent to the separator member between the first and second angular positions.

7. A method according to claim 1 wherein a dispensation sensor is operably engaged between the separator device and the orienting device, and the method further comprises pausing the rotation of the separator member until the one rod component is directed to the second orientation, in response to the dispensation sensor sensing the one rod component being dispensed from the separator member.

8. A method according to claim 2 wherein the one rod component includes opposed first and second ends spaced apart along the longitudinal axis thereof, and the method further comprises interacting one of the first and second ends of the one rod component with the orienting device, upon dispensation of the one rod component from the separating device, so as to rotate the one rod component about the one of the first and second ends and from the first orientation into the second orientation.

9. A method according to claim 8 further comprising receiving the one rod component disposed in the second orientation in a feed channel having an isolation device operably engaged therewith, the isolation device comprising first and second gate members each configured to retractably extend at least partially across the feed channel, and spaced apart along the feed channel by at least a desired length of the one rod component.

10. A method according to claim 9 further comprising retracting the first gate member from the feed channel upon detection of the one rod component within the feed channel, so as to allow the one rod component to proceed along the feed channel, and extending the first gate member back into the feed channel upon the one rod component being disposed between the first and second gate members.

11. A method according to claim 10 wherein an inspection device is operably engaged with the feed channel between the first and second gate members, with the inspection device comprising first and second sensor devices operably engaged with the feed channel so as to be capable of interacting with the one rod component, and the first and second sensor devices being spaced apart by no more than the desired length of the one rod component, and the method further comprises retracting the second gate member from the feed channel upon determination by the first and second sensor devices of the one rod component having at least the desired length, so as to release the one rod component from the isolation device for direction to the subsequent process.

* * * * *